A. R. WELCH, DEC'D.
M. E. WELCH, ADMINISTRATRIX.
TRACTOR.
APPLICATION FILED JUNE 19, 1912.
1,238,702.
Patented Aug. 28, 1917.
4 SHEETS—SHEET 2.
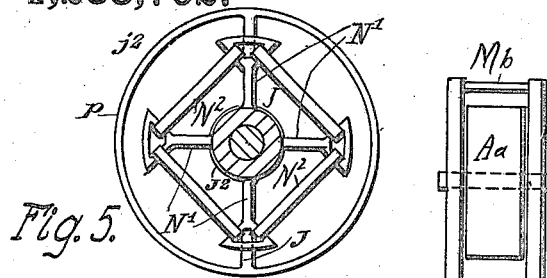
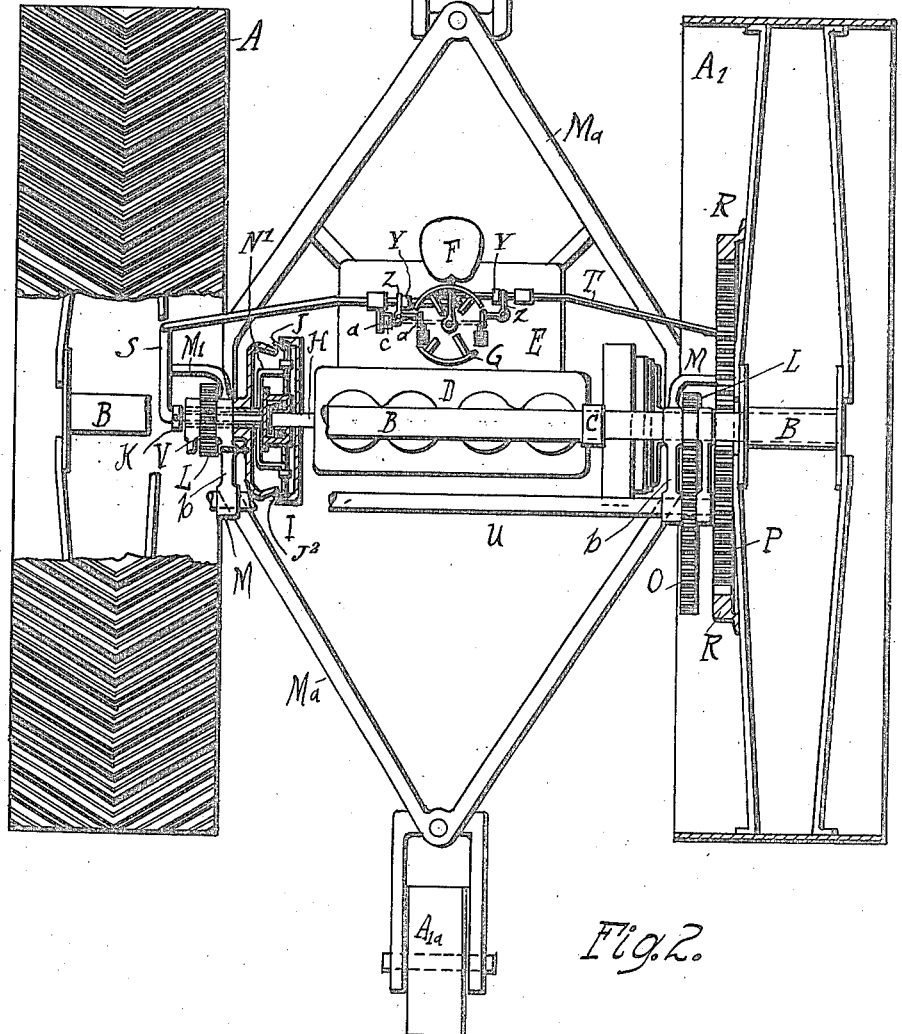
Fig. 2.
WITNESSES:
Paul A. R. Kroesing, Jr.
Virginia C. Spratt
INVENTOR
Allie R. Welch
BY
Raymond H. Parker
ATTORNEY A. R. WELCH, DEC'D.
M. E. WELCH, ADMINISTRATRIX.
TRACTOR.
APPLICATION FILED JUNE 19, 1912.

1,238,702.

Patented Aug. 28, 1917.
4 SHEETS—SHEET 3.

WITNESSES:

INVENTOR

BY

ATTORNEY

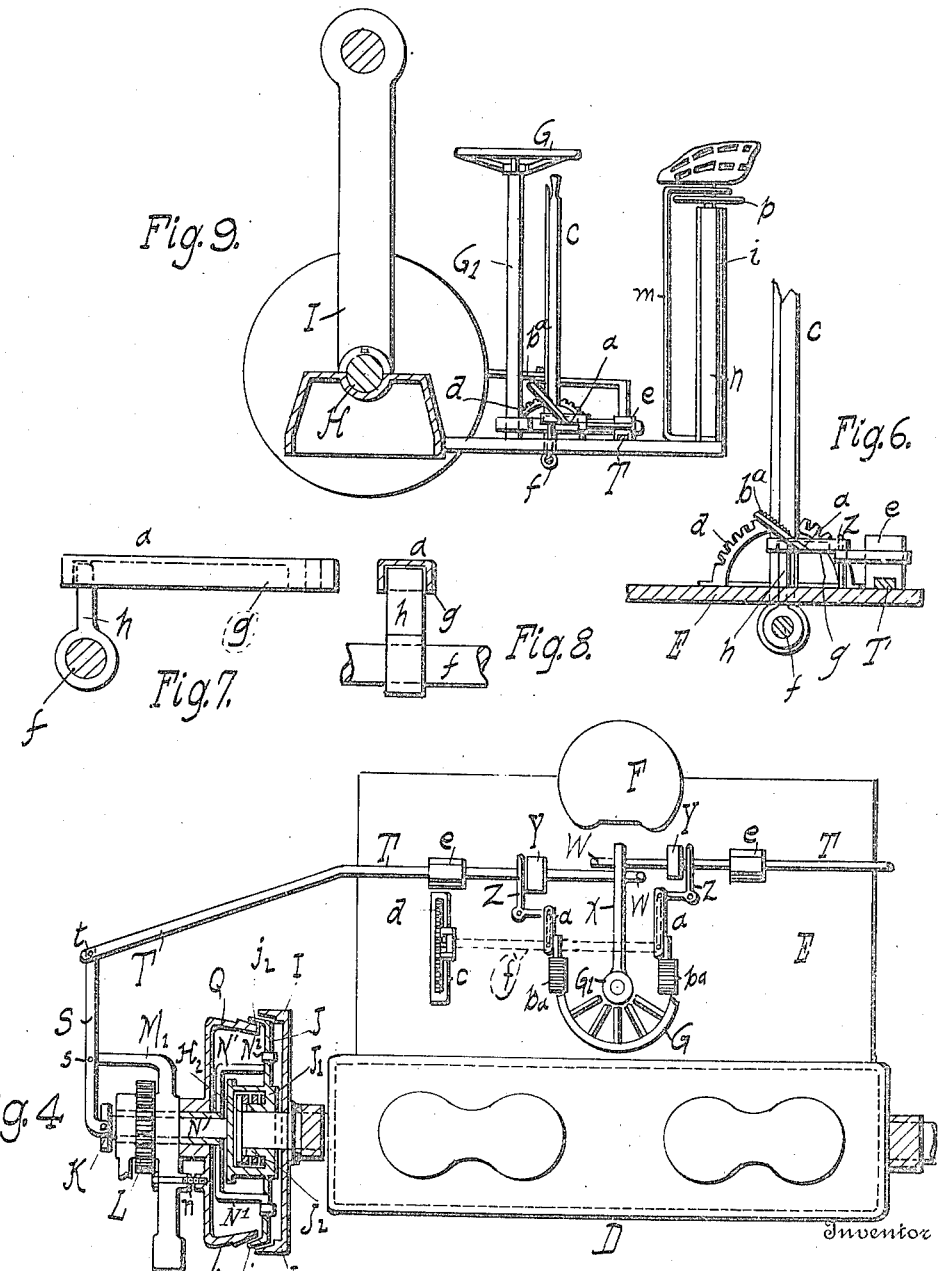

UNITED STATES PATENT OFFICE.

ALLIE R. WELCH, OF PONTIAC, MICHIGAN; MARY E. WELCH ADMINISTRATRIX OF SAID ALLIE R. WELCH, DECEASED.

TRACTOR.

1,238,702.  Specification of Letters Patent.  Patented Aug. 28, 1917.

Application filed June 19, 1912.  Serial No. 704,545.

*To all whom it may concern:*

Be it known that I, ALLIE R. WELCH, a citizen of the United States, residing at Pontiac, county of Oakland, State of Michigan, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

My invention relates to tractors and consists in the improvement hereinafter described and pointed out in the claims.

In the accompanying drawings:—

Fig. 2 is a plan view of the same, one of the wheels being shown in section and the other partly broken away and parts of the adjacent mechanism omitted and part being shown in section.

Fig. 4 is a plan view of the platform and mechanism thereon together with the driving and controlling mechanism located adjacent to one of the driving wheels, such mechanism being shown partly in section.

Fig. 5 is a detail elevation of the apparatus shown at the left of Fig. 4 looking from the right, the drum I being removed.

Fig. 6 is an elevation of a portion of the apparatus on the platform of the tractor, the platform itself, so far as shown, being in section.

Fig. 7 is a detail of a portion of the apparatus shown in Fig. 9.

Fig. 8 is an elevation looking from the right of Fig. 7, the bar $a$ being shown in cross section.

Fig. 9 is a side elevation of the platform and apparatus mounted thereon.

Fig. 10 is a detail perspective view of the parts shown in Fig. 5.

Figure 1:
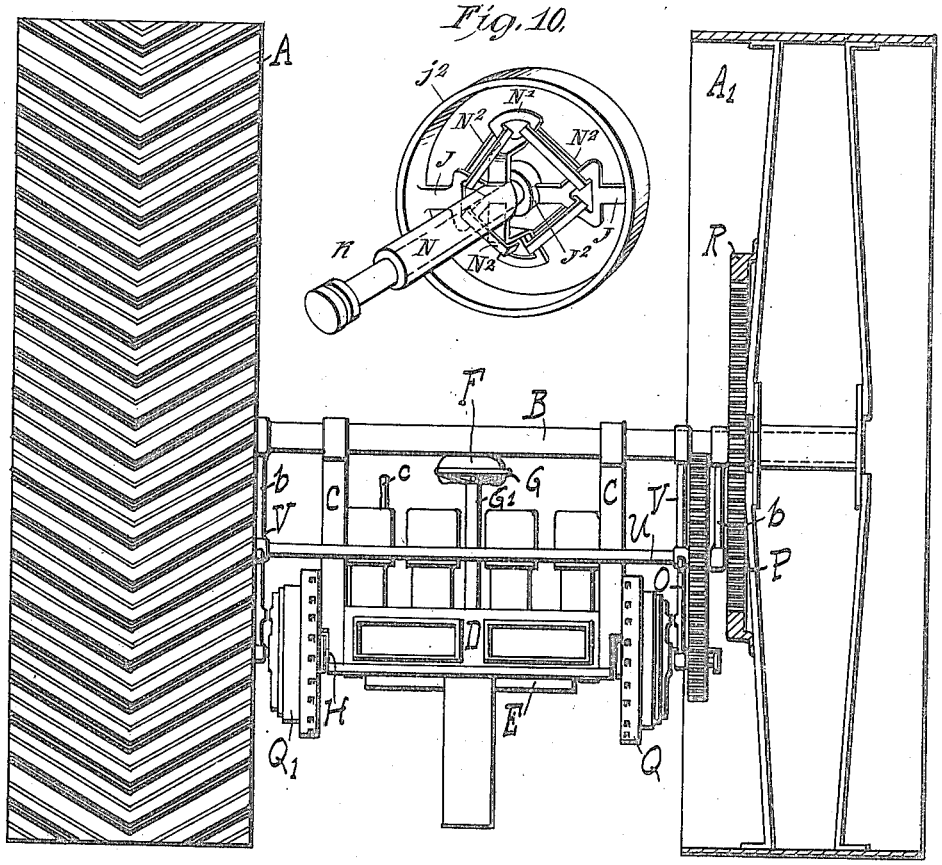
Figure 1 is an elevation of a tractor embodying my invention in which one of the driving wheels is shown in section.

In my improved tractor I employ but two wheels and I prefer to control and steer the same by means of the motion, or relative motion, of said wheels.

A, A1 are two driving wheels mounted upon an axle B so as to turn independent of said axle. C, C are hangers supporting a platform E; the hangers C, C bear upon the axle B at their upper ends and are free to rotate with reference to said axle.

D is a power plant, for instance, comprising an internal combustion engine, supported upon the platform E.

F, is the driver's seat mounted upon the platform E. G, is the steering or controlling wheel located upon the upper end of a steering post G1 which rises from the platform E. H, is the engine shaft.

I, (Fig. 4) is a brake drum and clutch member secured upon the engine shaft H so as to turn therewith and being provided with the usual internal conical surface. N, is a sleeve mounted in a bearing in the frame M which frame is immovably secured to the platform E. L, is a pinion or driving gear wheel keyed upon the sleeve N, so that said sleeve constitutes the shaft for said gear wheel. K, is a cylindrical rod passing through and fitting in an axial bore through the sleeve N. The rod K may be reciprocated longitudinally through the sleeve N and may turn relative to said sleeve. Q, is a stationary brake drum and clutch member secured at $n$ to the stationary frame M. J, $j2$ indicates a movable brake drum and clutch member upon the inner end of the rod K; this drum has a hub J2 (Fig. 4) bearing upon the engine shaft H. H2 is a flange on the inner end of the engine shaft H. J1, is a spring pressing at its outer end against the flange H2 and at its inner end against the hub of the drum J $j2$ so as to tend to move the same toward the drum I to clutch said drums together. Drum J has a rim $j2$ formed with double concaved surfaces, the outer one adapted to engage the conical surface of the drum I, and the inner one adapted to engage the conical surface of the stationary drum Q. The rim $j2$ is united to the hub of the movable drum $j2$ by radially extending spokes J.

N1 are arms extending radially from the inner end of the sleeve N then bending horizontally inward and upward to present portions parallel and in the plane of the spokes, J. N2 (Figs. 5 and 10) are flexible bands uniting the arms N1 and J.

Each of the wheels A, A1 has an annulus R secured thereto concentric therewith.

Said annulus is provided with internal gear teeth.

U is a shaft pivoted in the frame M in bearings supported by arms $b$ (Figs. 2 and 3) which extend from the axle B. O is a gear wheel upon the shaft U, its teeth engaging the teeth of the wheel L. P is a gear wheel upon the shaft U, its teeth engaging the internal teeth of the annulus R. When the pinion L is turned its motion is communicated to the wheel O and through the shaft U to the wheel P and through the engagement of the teeth of the wheel P with the annulus R, the driving wheel is actuated.

The mechanism adjacent to each driving wheel is the same as the other so that a description of one of these will be sufficient.

A reversing arrangement may of course be supplied.

S is a lever pivoted at $s$ to an extension M1 from the frame M. One end of the lever S engages a ring which fits in a groove upon the end of the rod K; thus said rod is free to rotate but a movement of the lever S will move said rod longitudinally. T is a rod pivoted at $t$ to the end of the lever S and adapted to slide in a bearing $e$ on the platform E. The inner end of each of the rods T is turned upward as indicated to form a lug W.

X is an arm extending from the steering post G1 horizontally, its outer end coming between the vertical ends of the rods T as indicated in Fig. 4. Y, Y are flanges or disk-like lugs secured upon the rods T T.

Z Z are bell-crank levers adapted to oscillate about pins rising vertically from the platform E. One arm of each of the bell-crank levers Z is adapted to contact the outer surface of a lug Y, said arm being free to move in the other direction. $a\ a$ are links having grooves $g$ (Figs. 7 and 8) in their under surfaces. The links $a\ a$ are pivotally connected to the outer ends of the transversely extending arms of the bell-crank levers Z Z.

$c$ is a lever secured at its lower end to a shaft $f$ so that said shaft may be rotated by manipulating said lever. $d$ is a notched quadrant by which the lever $c$ may be secured in any adjusted position. $h$ is an arm rising from the shaft $f$, its upper end extending into the groove $g$ in the lower surface of each of the links $a$. Said link is in part supported by resting upon the upper end of the arm $h$. $ba\ ba$ are pedals by which the links $a\ a$ may be actuated to oscillate the bell-crank levers Z Z so that their longitudinally extending arms shall actuate the lugs Y Y to draw the rods T T inward. Because of the slots $g$ the links $a\ a$ are free to move in one direction independent of the arms $h$ rising from the shaft $f$.

The spring J1 acts to draw the rod K inward to oscillate the lever S to draw the rod T outward and bring the bell-crank lever Z into the position shown in Fig. 4 where the links $a\ a$ are drawn backward, the walls at the end of the grooves $g$ contacting with pin $h$ (as shown in Figs. 7 and 8). In this position the movable brake drum J J2 is in contact with the drum I on the engine shaft H and the wheel is being driven by the engine. Thus normally both wheels are being driven by the engine so as to carry the tractor forward in a straight line. If it is desired to disconnect the engine the lever $c$ is moved forward which carries with it through the arms $h$ the links $a\ a$, turning the bell-crank levers Z Z about their pivots and drawing the rods T T inward and the rods K outward, thus separating the movable brake drum J $j2$ from the brake drum I on the shaft H. The parts may be locked in this position by the latch engaging the teeth in the usual way on the notch sector $d$. In this position the engine turns freely and does not actuate the driving wheels.

If it is desired to put the brake on both driving wheels at once the lever $c$ is moved farther forward thus drawing the rod K farther outward and carrying the movable drum J $j2$ into position to engage the stationary drum Q, by which engagement the driving wheels are prevented from turning through the sleeves N and gear wheels L.

The parts are shown in a neutral position in the figures in which position the engine is free to move without actuating the driving wheels.

To turn the tractor in one direction or the other, the wheel G is turned thus drawing upon one of the rods T T, a moderate movement separating the wheel upon the side toward which it is desired to turn, from the power shaft and a further movement, where a sudden turn is desired, locking said wheel by means of the brake drum J as will be understood from the above description. Where a quick turn is desired one or the other of the links $a\ a$ may be actuated by the foot of the driver pressing against the pedal $ba$, and one wheel quickly disconnected from the power or engaged to hold it from movement as above described.

Figure 3:
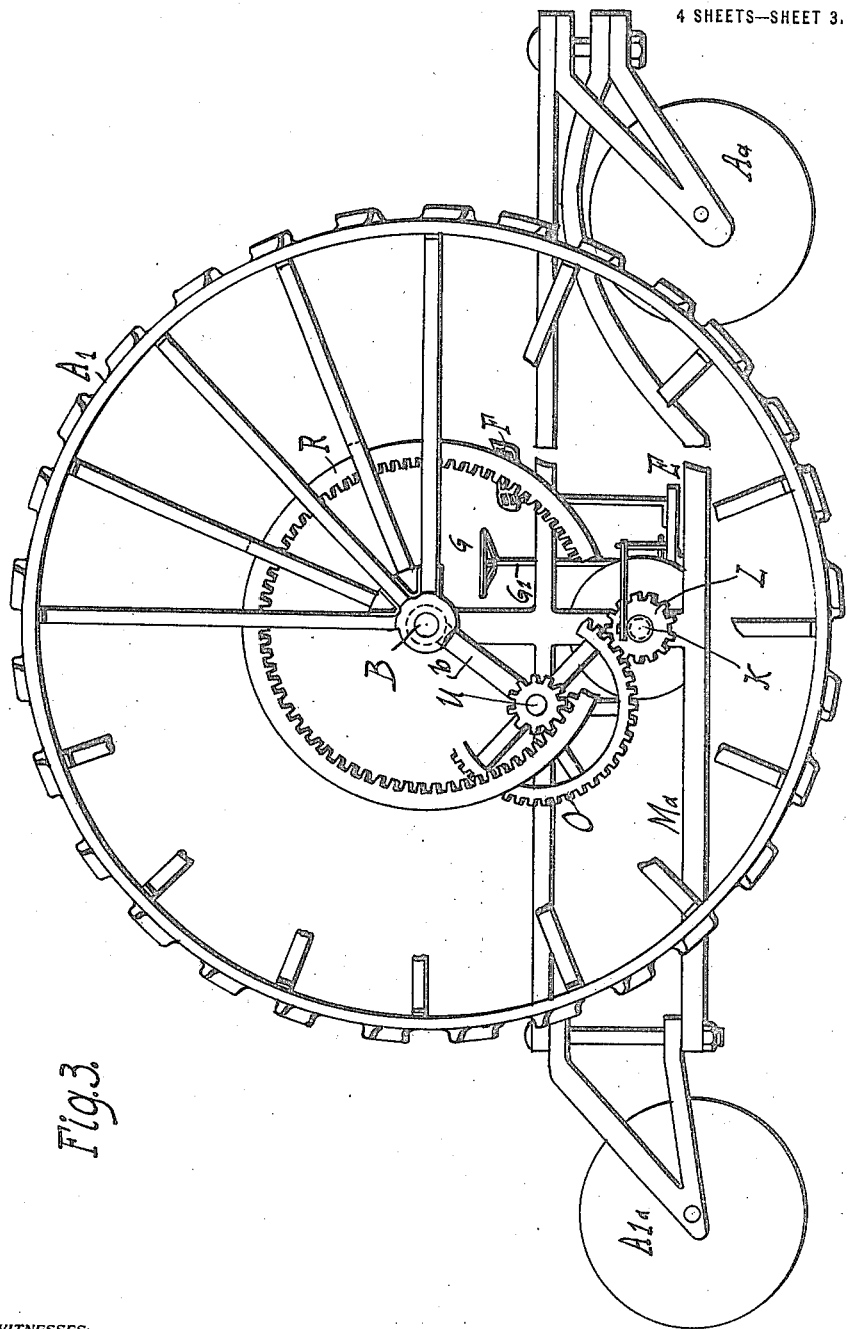
Fig. 3 is a side elevation of the same, the driving wheel being partly broken away to clearly show the construction located behind it.

Ma is a frame work, diamond shaped in plan view, as shown in Fig. 2. To the front and rear of the frame Ma is pivoted a caster wheel Aa A1a; these are so located that they shall be normally some little distance above the surface of the roadway upon which the wheels A, A1 travel, as shown in Fig. 3, but should the frame work tip beyond a certain point in either direction, one of these caster wheels will come in contact with the roadway and prevent further tipping of the frame.

To the portion of the frame work in which the rear casters Aa bears is a cross bolt Mb located just above the lowest point of said caster wheel. The bolt serves as a means for securing the table or chain through which the power of the machine is applied.

The action of the engine turning the gear wheels L tends to tip the power plant and the platform E upward rolling forward and upward on the internal gears R. The reaction of the load on the cross bar or bolt M$b$ counteracts this tendency.

What I claim is:

1. In a tractor, the combination with a power plant having a main shaft, a clutch member I on said main shaft, a stationary clutch member Q axially in line with the clutch member I, a driving wheel, a shaft N geared to said driving wheel and located axially in line with said main shaft, a clutch member J $j$2 between the clutch members I and Q adapted to engage either one of said clutch members, the clutch member J $j$2 being flexibly connected with the shaft N and means for actuating the clutch member J $j$2 to engage the clutch member I or the clutch member Q so as to permit motion of the member J $j$2 in the direction of the length of the shaft N and to prevent relative angular motion.

2. In a tractor, opposite driving wheels A and A1, a power plant, a separate means for connecting and disconnecting said power plant and each of said wheels to drive the same, a rod T adapted to operate each of the connecting and disconnecting means for said driving wheels and provided with a lug W, a steering apparatus G G1 adapted to be manipulated having a lever X extending between a lug W on one of the rods T and a lug W on the other of said rods T.

3. In a tractor, opposite driving wheels, A and A1, a power plant, a separate means for connecting and disconnecting said power plant and each of said wheels, a rod T adapted to operate each of the connecting and disconnecting means for said driving wheels, a means adapted to actuate each of the rods T in one direction, a lever $c$ adapted to be manipulated to actuate each of the rod actuating means in one direction being free to move independent of the rod actuating means in the other direction.

4. In a tractor, opposite driving wheels, A and A1, a power plant, a separate means for connecting and disconnecting said power plant with each of said wheels, a rod T adapted to operate each of the connecting and disconnecting means for said driving wheels, a lever Z adapted to actuate each of the rods T in one direction, a lever $c$ adapted to be manipulated to turn a shaft $f$, an arm on said shaft adapted to actuate each of the levers Z in one direction, and being free to move independent of said levers in the other direction, and an independent means for actuating each of said levers separately.

5. The combination of a driving shaft and a driven shaft adapted to turn in the same direction, a flexible connection between eccentric points on the respective shafts whereby the driving shaft drives the driven shaft, and one of said shafts is permitted to approach and recede from the other in the direction of their lengths but is restrained from relative angular motion substantially as and for the purpose described.

6. The combination of a driving shaft and a driven shaft adapted to turn in the same direction, a flexible connection between eccentric points on the respective shafts whereby the driving shaft drives the driven shaft, and one of said shafts is permitted to approach and recede from the other in the direction of their lengths but is restrained from relative angular motion, a clutch member on the longitudinally movable shaft, a stationary clutch member on one side of the first named clutch member, a clutch member on the other of said shafts on the other side of the first named clutch member, the first named clutch member being adapted to engage the other clutch members severally.

7. The combination of a driving shaft and a driven shaft adapted to turn in the same direction, a flexible connection between eccentric points on the respective shafts whereby the driving shaft drives the driven shaft, and one of said shafts is permitted to approach and recede from the other in the direction of their lengths but is restrained from relative angular motion, a clutch member on the longitudinally movable shaft, a clutch member on one side of the first named clutch member, a clutch member on the other side of the first named clutch member, the first named clutch member being adapted to engage the other clutch members severally.

8. In a tractor, opposite driving wheels A, A1, a power plant, a separate means for connecting and disconnecting said power plant and each of said wheels to drive the same, and means for actuating one or the other of said connecting means, but not both, adapted to permit separate actuation of said connecting and disconnecting means.

In testimony whereof, I sign this specification in the presence of two witnesses.

ALLIE R. WELCH.

Witnesses:
ELLIOTT J. STODDARD,
AGNES M. HIPKINS.